United States Patent
Grinbergs et al.

(10) Patent No.: US 7,007,740 B2
(45) Date of Patent: Mar. 7, 2006

(54) ADJUSTABLE FLOW HEAT RECOVERY VENTILATOR AND METHOD

(75) Inventors: Peter Karl Grinbergs, Dorchester (CA); William Kwan, London (CA)

(73) Assignee: Nutech R. Hldgs Inc., London (CA)

( * ) Notice: Subject to any disclaimer, the term of this patent is extended or adjusted under 35 U.S.C. 154(b) by 247 days.

(21) Appl. No.: 10/347,934

(22) Filed: Jan. 22, 2003

(65) Prior Publication Data

US 2004/0140080 A1      Jul. 22, 2004

(51) Int. Cl.
*F28F 27/00* (2006.01)
(52) U.S. Cl. ........................... 165/11.1; 165/54
(58) Field of Classification Search ............... 165/11.1, 165/54
See application file for complete search history.

(56) References Cited

U.S. PATENT DOCUMENTS

| | | | |
|---|---|---|---|
| 3,176,502 A * | 4/1965 | Cizek et al. ................. | 73/37.5 |
| 4,437,608 A * | 3/1984 | Smith ......................... | 165/246 |
| 5,024,263 A * | 6/1991 | Laine et al. .................. | 165/54 |
| 5,761,908 A * | 6/1998 | Oas et al. ..................... | 165/54 |
| 5,806,582 A * | 9/1998 | Santavuori et al. ........... | 165/54 |
| 6,119,529 A * | 9/2000 | Di Marco et al. ........ | 73/861.68 |
| 6,209,622 B1 | 4/2001 | Lagace et al. | |
| 2002/0040775 A1 * | 4/2002 | Bassilakis .................... | 165/54 |

* cited by examiner

*Primary Examiner*—Teresa J. Walberg

(57) ABSTRACT

A novel system for and method of balancing fresh air flow and exhaust air flow through a ventilator. The ventilator has an air-to-air heat exchanger operably mounted within a principal fresh air flow passage and a principal stale air flow passage. A flow meter is provided for connection to the principal fresh air flow passage and the principal stale air flow passage, across the air-to-air heat exchanger. The flow meter is proportionally responsive to mass flow of the air flow passages to which they are connected. Further involved is at least one damper within at least one of the air flow passages. To ensure that both air flow measurements indicate a substantially equal response, each damper can be adjusted to change the amount of air flow within its respective air flow passage.

11 Claims, 2 Drawing Sheets

ADJUSTABLE FLOW HEAT RECOVERY VENTILATOR AND METHOD

FIELD OF THE INVENTION

The present invention relates to heat recovery ventilators (HRVs) and to methods of balancing air flow rate throughout a heat recovery ventilator (HRV).

BACKGROUND OF THE INVENTION

To control heating and cooling costs, new buildings are being built in a more air-tight manner. One drawback of such construction is the decrease of fresh air flow rate into these buildings, and the resulting build-up of indoor air pollutants such as excess moisture, carbon dioxide, formaldehyde and various volatile organic compounds found in building materials, paints, furnishings, cleaning products and smoke. Opening a window to reduce this build-up results in a loss of heating or cooling energy from the home, negating the energy-saving effect of an air-tight construction.

HRVs are designed to provide proper ventilation to a well-insulated building while maintaining the temperature of the building by recovering the heating or cooling energy from the exhausted stale air.

An HRV is generally installed in a basement and is connected to air-supply and air-return vents through ductwork. An HRV has two air paths, a fresh air path through which fresh air enters the building and a stale air path through which stale air exits the building. Between the two air flow paths is the HRV core, which is an air-to-air heat exchanger. During the winter months, the cold fresh air entering the building is heated by the warm, stale air leaving the building, via the HRV core.

To ensure efficient operation of an HRV, the air flow rate through the HRV needs to be balanced. In other words, the rate at which fresh air enters a building and the rate at which stale air leaves the building needs to be made approximately equal. As a result, every HRV must be manually balanced upon installation. This is generally done by a qualified installation technician, and is accomplished by first measuring the mass air flow rate in each air path, and then adjusting one or more dampers in the air paths to balance the air flow. This process may be repeated by a person on a regular basis to ensure the continued efficiency of the HRV.

Several methods exist for measuring the air flow rate in each air path. A person may create a crude measuring device by taping the opening of a large plastic bag about an untwisted wire coat hanger. The person may then place the mouth of this bag about the stale air exhaust hood and count the number of seconds before the bag inflates. He or she may then place the mouth of the bag about the fresh air intake hood and do the same. By this process, the person may develop a crude estimate of the relative difference in mass air flow rate between the two air paths. Adjustment of the air flow rate in the air flow paths can then be made, normally by adjusting one or more dampers within the ductwork.

Another method of measuring the volume air flow rate in the air paths involves the drilling of a small hole in each air flow path and inserting a Pitot tube into each hole. As will be known by one skilled in the art, each Pitot tube will measure the total air pressure and the static air pressure at the point of insertion. The Pitot tubes are each connected to a separate manometer, which will effectively subtract the measured static pressure from the measured total pressure to obtain and display the velocity pressure at the point of insertion. (Total pressure equals static pressure plus velocity pressure). As velocity pressure is proportional to gas density and the square of the velocity volume air flow rate, one or more dampers can then be adjusted, if necessary, until the manometers readings are equal. The mass air flow is obtained by multiplying the average volumetric flow rate with the fluid density.

Yet another method of measuring the mass air flow rate in the air paths of an HRV with a view to balance the HRV is disclosed by U.S. Pat. No. 6,209,622, issued Apr. 3, 2001 to Lagace et al. The Lagace et al. method involves the determination of a static pressure difference between two points on each air flow path. The static pressure differences are then converted to air flow rate values by a technician using a conversion chart. One or more dampers can then be adjusted to balance the air flow rate in each air flow path.

SUMMARY OF THE INVENTION

The present invention provides a modified HRV which may provide a constant indication of the air flow rates in each air flow rate path. The air flow rates through the modified HRV may be assessed through simple visual inspection, without any need for extraneous measurement equipment.

The present invention also provides a novel method for balancing mass air flow rate between the stale air flow path and the fresh air flow path of an HRV. The method involves directly measuring the mass flow of the air in each air flow path by directing a small sample of the air (bypass airflow) from each air flow path through a separate flow meter. Each flow meter may indicate the corresponding mass air flow rate in the corresponding air flow path. One or more dampers may subsequently be adjusted until the readings on each flow meter are equal.

The present invention involves setting up a bypass airflow path in which the bypass air flow is proportional to the principle air flow path through the heat exchanger. The bypass air flow is directly read and has been engineered to be proportional to the principle air flow. As such, the indicating ball in the flow meter responds to the mass flow or velocity of the air moving in the bypass.

In accordance with one aspect of the present invention there is provided a system for balancing fresh air flow and exhaust air flow through a ventilator, said ventilator having an air-to-air heat exchanger operably mounted within a principal fresh air flow passage and a principal stale air flow passage, said system comprising a first flow meter connected to said principal fresh air flow passage in parallel to said air-to-air heat exchanger, said first flow meter proportionally responsive to mass flow of the air within said first air flow passage; a second flow meter connected to said principal stale air flow passage in parallel to said air-to-air heat exchanger, said second flow meter proportionally responsive to mass flow of the air flow within said second air flow passage; and at least one damper within at least one air flow passage, said at least one damper adjustable to change the amount of air flow within said at least one air flow passage, such that said first air flow meter and said second air flow meter indicate a substantially equal response.

In accordance with another aspect of the present invention, there is provided a method for balancing fresh air flow and exhaust air flow through a ventilator, said ventilator having a air-to-air heat exchanger operably mounted within a principal fresh air flow passage and a principal stale air flow passage, at least one of said air flow passages having at least one damper, said method comprising the steps of: connecting a first flow meter to said principal fresh air flow passage in parallel to said air-to-air heat exchanger, said first flow meter proportionally responsive to mass flow of the air flow within said first air flow passage; connecting a second flow meter to said principal stale air flow passage in parallel to said air-to-air heat exchanger, said second flow meter proportionally responsive to mass flow of the air flow within said second air flow passage; and adjusting said at least one damper to change the amount of air flow within said at least one air flow passage, such that said first air flow meter and said second air flow meter indicate a substantially equal response.

These and other objects of the present invention will become apparent to those skilled in the art with the aid of the drawings hereinbelow:

BRIEF DESCRIPTIONS OF THE DRAWINGS

FIG. 2 further represents a presentation of two air flow meters connected to an HRV in a manner suitable for performing the method of the present invention.

DETAILED DESCRIPTIONS OF THE DRAWINGS

Figure 1:
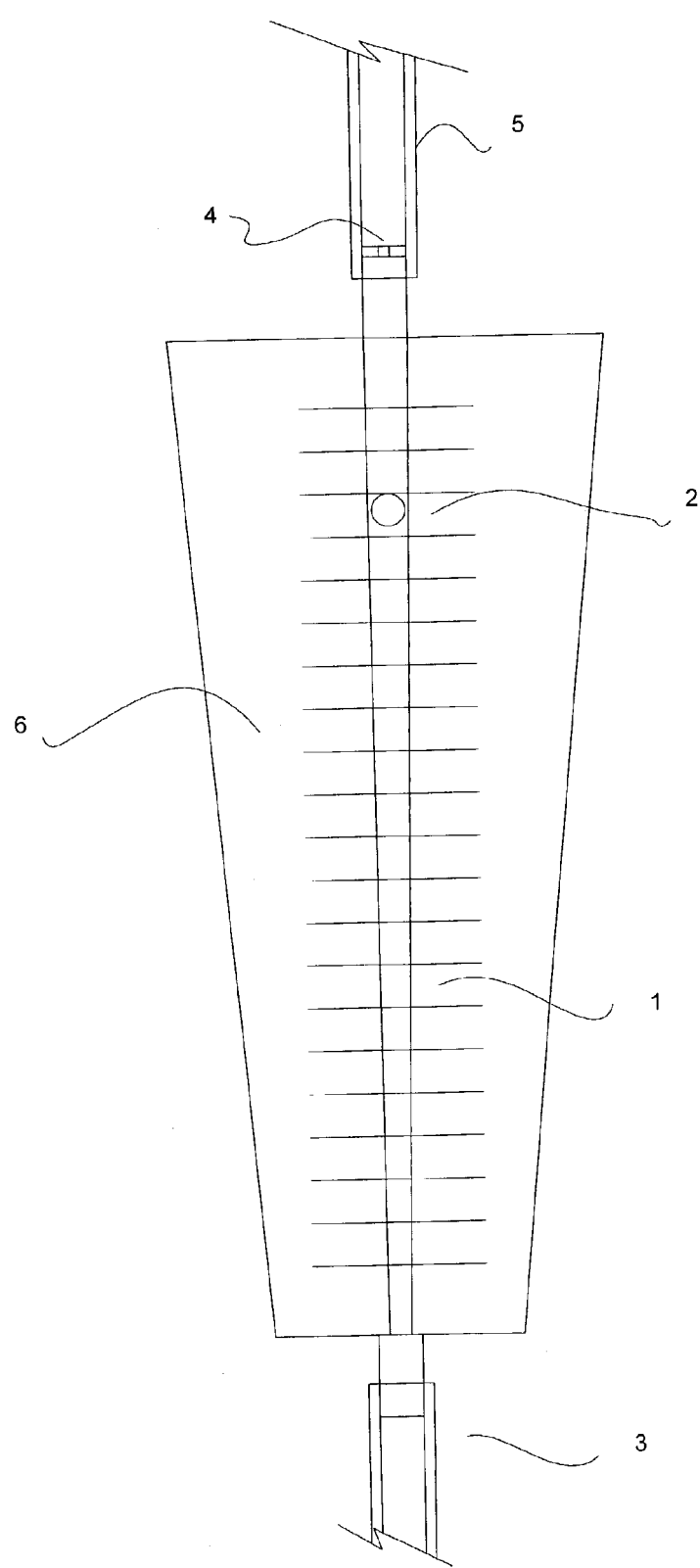
FIG. 1 is a diagram of an embodiment of a flow meter for use with the present invention.

FIG. 1 illustrates an embodiment of a flow meter suitable for use in the operation of the present invention. The flow meter consists of a ball 2 at rest in the narrow end of a tapered tube 1. Air enters the flow meter through a first nipple 3 on the tapered end of the tapered tube 1. The entering air causes the ball 2 to rise, passes through an orifice 4 and finally exits from a second nipple 5 on the wide end of the tapered tube 1. Orifice 4 is designed to control the dynamic range of the ball 2. Higher air flow rates will necessitate a smaller orifice, and lower air flow rates may be better served by a larger orifice. A scale 6 relating mass air flow rate to ball height is marked on the area meter. Such a scale may be devised in accordance with the following relationships between the properties of the area meter, the air, and the surrounding environment.

The average velocity ($V_{avg}$) in of the air in the tapered tube is determined with a force balance on the ball. The upward force of buoyancy and the drag force (due to air moving around the ball) are balanced by the downward force of gravity acting on the ball. The drag force is a function of $V_{avg}$ and fluid properties. A general equation for $V_{avg}$ is:

$$V_{avg} = ((2g(\rho_b - \rho)m)/(A_p \rho_b C_D \rho))^{1/2} \qquad \text{Equation 1}$$

where
 $V_{avg}$=average velocity of air
 g=acceleration due to gravity
 $\rho_b$=ball density
 $\rho$=fluid density of air
 $C_D$=drag coefficient
 $A_p$=projected area
 m=mass of ball At any ball height, the mass air flow rate is given by:

$$Q = V_{avg} \pi (D_t^2 - D_b^2)\rho/4 \qquad \text{Equation 2}$$

where
 $V_{avg}$=average velocity in the annulus between the tube and the ball
 $D_t$=tube diameter at h (h=height reached by ball)
 $D_b$=ball diameter
 $\rho$=fluid density of air The taper causes the area of the tube to increase with height. For a tube that expands linearly and has a diameter that is the same as the ball diameter at the bottom, the term $D_t^2 - D_b^2$ can be expressed by:

$$D_t^2 - D_b^2 = (D_b + ah)^2 - D_f^2 = 2D_b ah + a^2 h^2 \qquad \text{Equation 3}$$

where
 a=slope of the expansion of the tube
 h=height reached by the ball
 $D_t$ tube diameter at h
 $D_b$=ball diameter By substituting equation 1 into equation 2, and subsequently substituting modified equation 2 into equation 3, an new equation is obtained between the volume air flow rate and the ball height, which can be used to devise a scale for the air flow rate meter.

Figure 2:
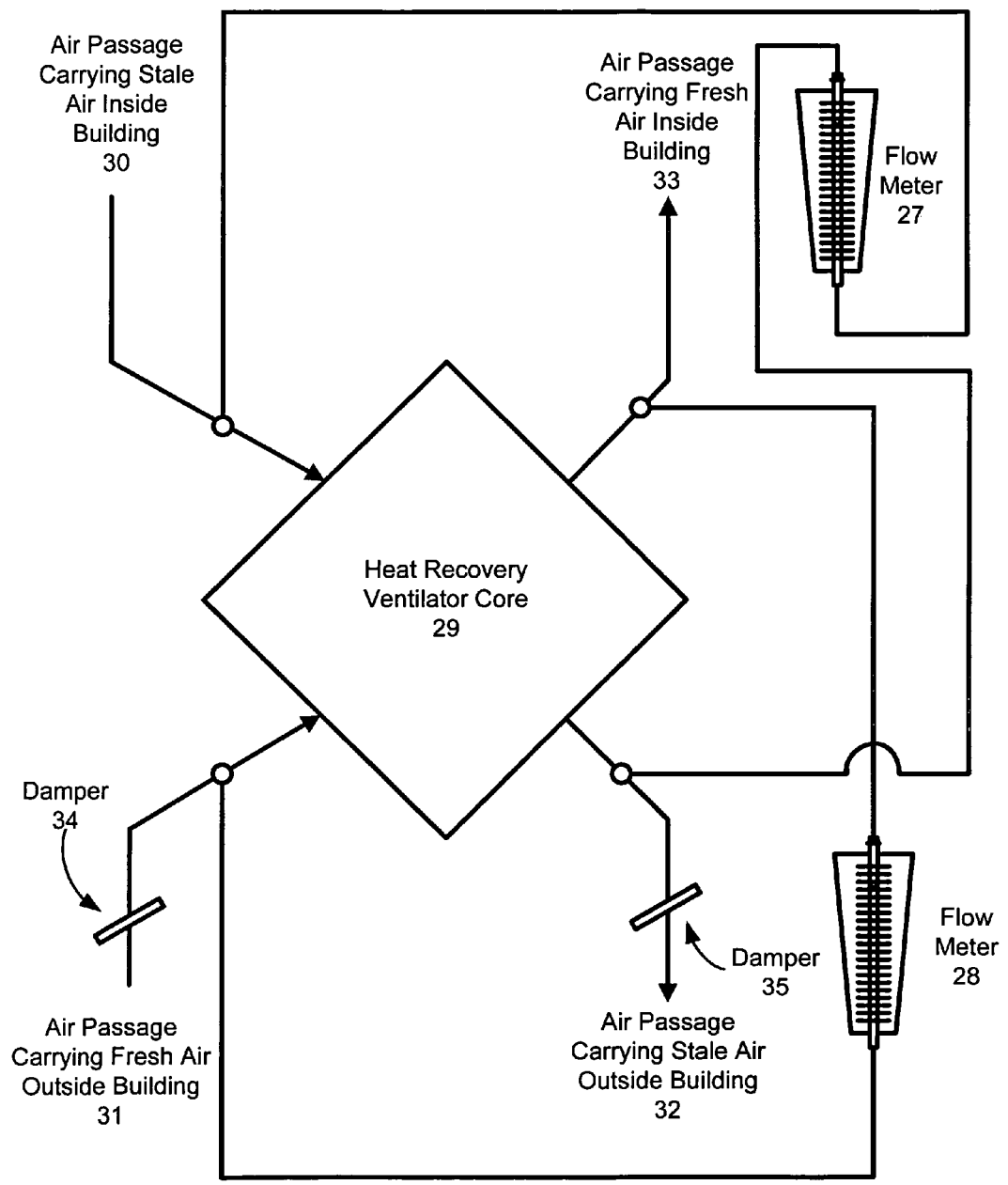
FIG. 2 is a schematic diagram of an embodiment of the apparatus of the present invention.

FIG. 2 shows an HRV core (an air-to-air heat exchanger) 29 connected to air passages 30, 31, 32 and 33. Each air passage is defined by an air flow path and the ductwork to which the air flow path is connected. Air passage 30 carries exhaust air from inside the house to the HRV core 29, where it is then expelled to the outside of the house through air passage 32. Air passage 31 carries fresh air into the HRV from outside the house where it is then brought inside the house through air passage 33. Thus the "stale air path" is formed by air passages 30, 32 and the "fresh air path" is formed by air passages 31, 33. The HRV core 29 functions to transfer heat from the stale air path to the fresh air path.

Flow meter 27 is connected to the stale air path and flow meter 28 is connected to the fresh air path. The connections may comprise flexible tubing connected to holes drilled in the door of the HRV cabinet immediately upstream and downstream of the HRV core 29. Protrusions or shrouds may be used, respectively, to increase or decrease the amount of air that flows through the flow meters 27, 28.

The flow meter design illustrated in FIGS. 1 and 2 is but one embodiment of a type suitable for use in the present invention. Other flow meters, such as digital, turbine and paddle wheel flow meters would also meet the needs of the present invention.

Dampers 34 and 35 are positioned in air flow passages 31 and 32, respectively. Dampers 34, 35 may be individually adjusted to vary the amount of air flow through the fresh air path and/or the stale air path.

A small sample of air from each air flow path will bypass the HRV core 29 and pass through the respective flow meter 27, 28. The flow meters 27, 28 are connected for air flow in the same direction as the HRV core 29: the inlet of each flow meter is connected to the upstream side 30, 31 of the respective air path and the outlet of each flow meter is connected to the respective downstream side 32, 33. Due to the narrow gaps in the HRV core 29, the air flow is essentially laminar and will vary linearly with the pressure drop across the HRV core 29. The mass flow across each flow meter 27, 28 is measured directly by the height of the ball 2. The height of the ball 2 in each flow meter 27,28 also represents the mass flow across the corresponding air flow path through the HRV core 29, as the mass flow across each flow meter 27, 28 is proportional to the mass flow rate across the corresponding air flow path through the HRV core 29. The following equations may be used to illustrate the above-described relationships:

$$Q_{core} = K_c \Delta P \qquad \text{Equation 4}$$

where
 $Q_{core}$=mass flow rate in the core
 $K_c$=constant for the core (a function of fluid properties and geometry)

ΔP=pressure drop (or driving force) through the core $$Q = K_m \Delta P \qquad \text{Equation 5}$$

where
- m=flow rate in the flow meter
- $K_m$=constant for the meter (a function of fluid properties and geometry)
- ΔP=pressure drop (or driving force) through the meter For turbulent flow, m will vary with the square root of ΔP. As long as the lines connecting the flow meters to the air flow passages are kept short or an orifice is used to increase the resistance in the flow meter, $K_m$ will essentially be only a function of the fluid properties and flow meter geometry. As the fluid constants and flow meter geometry may differ between the stale air path and the fresh air path, $K_m$ may differ for each meter.

Due to the complexity of the HRV system, a preferred embodiment of the present invention may involve obtaining calibration curves that relate ball height with mass air flow rate through an air flow path through the core.

After consulting the measurements of the flow meters 27, 28, one or both dampers 34, 35 may be adjusted as necessary to vary the air flow through one or both air flow paths, so as to obtain substantially equal readings on flow meters 27, 28.

What is claimed is:

1. A system for balancing fresh air flow and exhaust air flow through a ventilator, said ventilator having an air-to-air heat exchanger operably mounted within a principal fresh airflow passage and a principal stale air flow passage, said system comprising:
   - a first flow meter for connection to said principal fresh air flow passage across said air-to-air heat exchanger, said first flow meter for proportionally measuring mass fresh air flow through said air-to-air heat exchanger;
   - a second flow meter for connection to said principal stale air flow passage across said air-to-air heat exchanger, said second flow meter for proportionally measuring mass stale air flow through said air-to-air heat exchanger; and
   - at least one damper within at least one of said principal fresh air flow passage or said principal stale air passage, said at least one damper adjustable to change the amount of air flow within said at least one of said principal fresh air flow passage or said principal stale air passage, such that said first air flow meter and said second air flow meter indicate a substantially equal proportional measurement of mass air flow across said air-to-air heat exchanger.

2. The system of claim 1, wherein said first and second flow meters each comprise:
   - a tapered tube having a narrow open end and a wide open end; and
   - a ball movable within said tapered tube, such that air may enter the narrow open end of said tapered tube and exit the wide end of said tapered tube, causing said ball to rise.

3. The system of claim 2, wherein said wide open ends of said first and second flow meters comprise an orifice, the size of which adjusts the dynamic range of said first and second flow meters.

4. The system of claim 2, wherein said first and second flow meters have a readable scale relating ball height to mass air flow.

5. The system of claim 1, wherein said first flow meter or said second flow meter are selected from the group consisting of flow meters comprising a digital flow meter, a turbine flow meter and a paddle flow meter.

6. A method for balancing fresh air flow and exhaust air flow through a ventilator, said ventilator having a air-to-air heat exchanger operably mounted within a principal fresh air flow passage and a principal stale air flow passage, at least one of said principal air flow passages having at least one damper, said method comprising the steps of:
   - taking a first proportional measurement of mass air flow across said air-to-air heat exchanger within said principal fresh air flow passage;
   - taking a second proportional measurement of mass air flow across said air-to-air heat exchanger with said principal stale air flow passage; and
   - adjusting said at least one damper to change the amount of air flow within said at least one principal air flow passage, such that said first proportional measurement and said second proportional measurement indicate a substantially equal mass air flow through said air-to-air heat exchanger.

7. A system for balancing fresh air flow and exhaust air flow through a ventilator, said ventilator having an air-to-air heat exchanger operably mounted within a principal fresh air flow passage and a principal stale air flow passage, said system comprising:
   - a flow meter for connection to said principal fresh air flow passage across said air-to-air heat exchanger, for proportionally measuring mass fresh air flow through said air-to-air heat exchanger, and for connection to said principal stale air flow passage across said air-to-air heat exchanger, for proportionally measuring mass stale air flow through said air-to-air heat exchanger; and
   - at least one damper within at least one of said principal fresh air flow passage or said principal stale air passage, said at least one damper adjustable to change the amount of air flow within said at least one of said principal fresh air flow passage or said principal stale air passage, such that said air flow meter indicates a substantially equal proportional measurement of mass air flow across said air-to-air heat exchanger for said principal fresh air flow passage and said principal stale air flow passage.

8. The system of claim 7, wherein said flow meter comprises:
   - a tapered tube having a narrow open end and a wide open end; and
   - a ball movable within said tapered tube, such that air may enter the narrow open end of said tapered tube and exit the wide end of said tapered tube, causing said ball to rise.

9. The system of claim 8, wherein said wide open end of said flow meter comprises an orifice, the size of which adjusts the dynamic range of said flow meter.

10. The system of claim 8, wherein said flow meter has a readable scale relating ball height to mass air flow.

11. The system of claim 7, wherein said flow meter is selected from the group consisting of flow meters comprising a digital flow meter, a turbine flow meter and a paddle flow meter.

* * * * *